(12) United States Patent
Ma et al.

(10) Patent No.: US 7,050,158 B2
(45) Date of Patent: May 23, 2006

(54) COMPACT IMAGE PICKUP MODULE

(76) Inventors: Guolin Ma, 2169 Yosemite Dr., Milpitas, CA (US) 95035; Jason T. Hartlove, 1943 Alford Ave., Los Altos, CA (US) 94024

( * ) Notice: Subject to any disclaimer, the term of this patent is extended or adjusted under 35 U.S.C. 154(b) by 258 days.

(21) Appl. No.: 10/330,760

(22) Filed: Dec. 24, 2002

(65) Prior Publication Data
US 2004/0119968 A1    Jun. 24, 2004

(51) Int. Cl.
*G06K 9/74* (2006.01)

(52) U.S. Cl. ........................................ 356/71

(58) Field of Classification Search ................. 356/71; 382/124, 127; 250/227.11, 556
See application file for complete search history.

(56) References Cited

U.S. PATENT DOCUMENTS

| 3,975,711 | A |   | 8/1976  | McMahon |
| 4,681,435 | A |   | 7/1987  | Kubota et al. |
| 5,051,576 | A |   | 9/1991  | Schiller |
| 5,177,435 | A |   | 1/1993  | Kiyokawa et al. |
| 5,233,404 | A |   | 8/1993  | Lougheed et al. |
| 5,796,858 | A | * | 8/1998  | Zhou et al. ............. 382/127 |
| 5,864,721 | A | * | 1/1999  | Suda et al. ............. 396/114 |
| 6,154,285 | A |   | 11/2000 | Teng et al. |
| 6,324,020 | B1|   | 11/2001 | Teng et al. |
| 2004/0026635 | A1 | * | 2/2004 | Lee et al. ............. 250/556 |

\* cited by examiner

*Primary Examiner*—Tu T. Nguyen

(57) ABSTRACT

An image pickup module made of clear polymer includes an imaging surface, a first mirror, and a second mirror. An object is placed on the imaging surface for imaging. Incident light reflects off the imaging surface. The first of the two mirrors directs the reflected light toward the second mirror. The second mirror directs the directed light toward an image sensor. The two mirrors focus the reflected light on the imaging sensor which converts the focused light to electronic signals to be processed by a microcontroller. The use of the mirrors to direct the reflected light (embodying the image information) has the effect of having a relatively long focal length within a relatively short image pickup module design thereby allowing the pickup module to be manufactured having reduced height compared to prior art pickup modules. The reduced height allows for manufacture of smaller, more convenient image pickup devices.

19 Claims, 3 Drawing Sheets

COMPACT IMAGE PICKUP MODULE

BACKGROUND

The present invention relates to optical image acquisition devices. More particularly the present invention relates to image pickup modules adaptable for scanning fingerprints, handprints, and other biometrics.

Image pickup devices and modules are being implemented in increasing numbers as more and more images are digitized for storage and processing. For example, biometric devices such as fingerprint scanning devices are used in increasing numbers as identifying devices used to identify a user for the purposes of providing access to restricted information, equipment, or services.

FIG. 1 illustrates one embodiment of a prior art image (fingerprint) pickup system 10. In the prior art system 10, a light source 12 provides incident light 14 that is transmitted into a prism 16 through a light receiving surface 18 of the prism 16. The incident light 14 meets an imaging surface 20 at an incident angle 22 with respect to a normal angle to the imaging surface 20, the normal angle represented by a normal line 24. At the incident angle 22, the incident light 14 experiences total internal reflection (TIR) at the imaging surface 20 because the incident angle 22 is greater than the critical angle with respect to the imaging surface 20. The TIR phenomenon and the critical angle are known in the art.

As the incident light 14 reflects off of the imaging surface 20, different portions of the incident light 14 experience different amount of scattering, absorption, reflection, or a combination of these. This is because of fingerprint ridges and valleys present at the imaging surface 20. Accordingly, the reflection results in reflected light 26 having portions of varying intensities, the varying intensities representing the fingerprint pattern.

The reflected light 26 is then focused by a lens assembly 28 onto an image sensor 30 which converts the reflected light 26 including the fingerprint pattern it embodies into electronic signals to be processed and stored by a processor 32 connected to the image sensor 30. Vectors 14 and 26 and other vectors used in the Figures to illustrate directions of light are used only for clarity of discussion and are not intended to represent ray traces as is often used in the art of optics. For simplicity, the lens assembly 28 is illustrated as only one lens; however, the lens assembly 28 may include multiple lens, optics components, or a combination of these.

To focus the reflected light 26 onto the image sensor 30 with minimal distortion, the lens assembly 28 and the image sensor 30 are often placed relatively far from the prism 16 including the imaging surface 20. For example, U.S. Pat. No. 3,975,711 granted to McMahon specifies 40 centimeters (cm) for the distance between the prism 16 and the lens 28.

To reduce bulk and manufacturing costs, it is often desirable to reduce the height 34 of the image pickup system 10. However, moving the lens assembly 28 and the image sensor 30 closer to the prism 16 would introduce and increase distortions of the captured image (fingerprint pattern in the present example). Further, to place the lens assembly 28 closer to the prism 16, a larger lens assembly 28 would be required compared to the required size of the lens assembly 28 placed relatively distant from the prism 16. This is to reduce distortions of the image (fingerprint pattern) aggravated by the closer placement of the lens assembly 28, especially near the edges of the image (fingerprint pattern). In the illustrated sample, the height 34 can also be considered the focal length required to effectively focus the image (fingerprint pattern) onto the image sensor 30.

Currently, image pickup modules having a height 34 ranging from four to five cm are available. However, even these modules are too tall and bulky to be conveniently implemented in smaller electronic devices such as a mobile wireless telephones.

Consequently, there remains a need for a more compact image pickup module and system.

SUMMARY

The need is met by the present invention. In a first embodiment of the present invention, an image pickup module includes an imaging surface on which an object is placed for imaging, the imaging surface reflecting incident light, and two mirrors. The first of the two mirrors directs the reflected light toward the second mirror. The second mirror directs the directed light toward an image sensor.

In a second embodiment of the present invention, an electronic apparatus includes a light source to provide light incident on an imaging surface and an image pickup module. The image pickup module has an imaging surface on which an object is placed for imaging, the imaging surface reflecting the incident light and two mirrors. The first of the two mirrors directs the reflected light toward the second mirror. The second mirror directs the directed light toward an image sensor. The image sensor is adapted to convert the twice directed light into electronic signals. A microcontroller connected to the image sensor is adapted to process the electronic signals.

Other aspects and advantages of the present invention will become apparent from the following detailed description, taken in conjunction with the accompanying drawings, illustrating by way of example the principles of the invention.

DETAILED DESCRIPTION

As shown in the figures for the purposes of illustration, an embodiment of the present invention is exemplified by an image pickup module including an imaging surface, and two mirrors. Light (incident light) from a light source shines on the imaging surface on which an object such as a finger is placed for imaging. The imaging surface reflects the incident light, the reflected light embodying the image of the object placed on the imaging surface such as the fingerprint. The first mirror directs the reflected light toward a second mirror which, in turn, directs the directed light toward an image sensor. The use of the mirrors to direct the reflected light (embodying the fingerprint information) has the effect of folding the relatively long focal length 34 of FIG. 1 thereby allowing the pickup module to be manufactured having reduced height.

Figure 2:
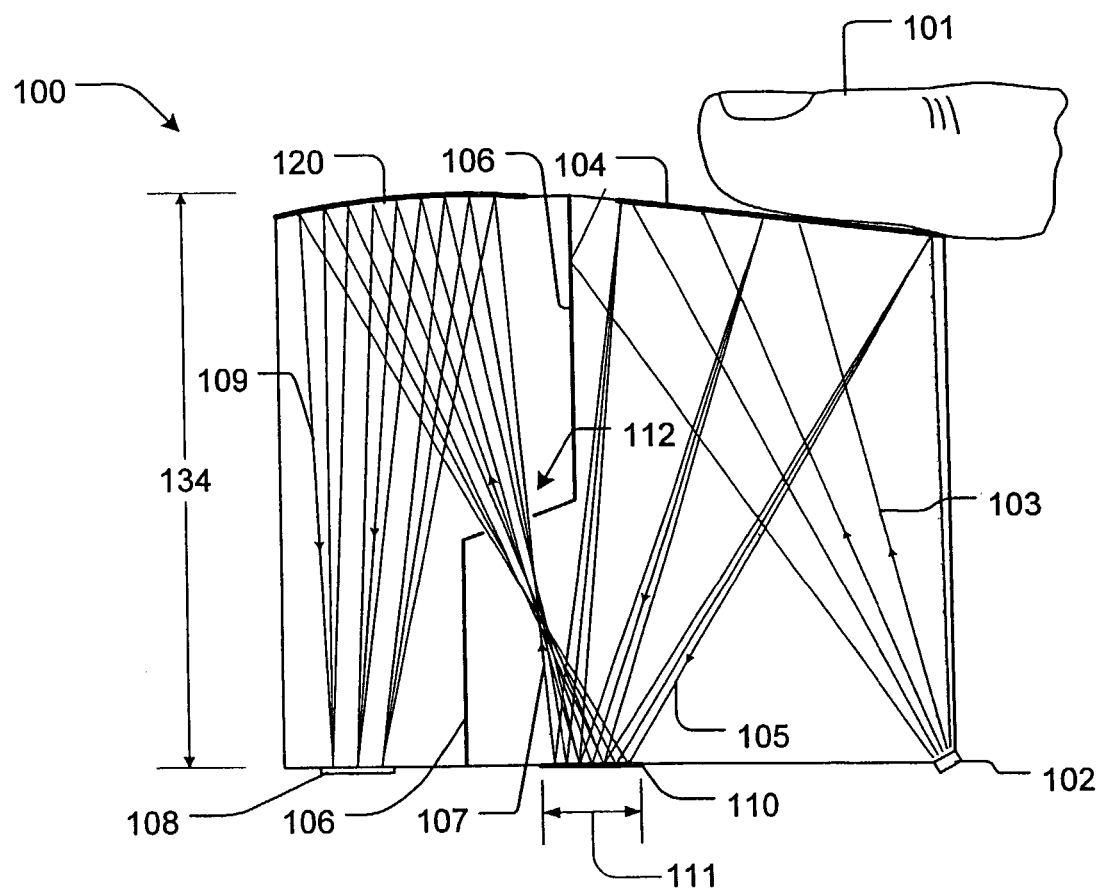
FIG. 2 illustrates a cutaway side view of an image pickup module according to one embodiment of the present invention.
Figure 3:
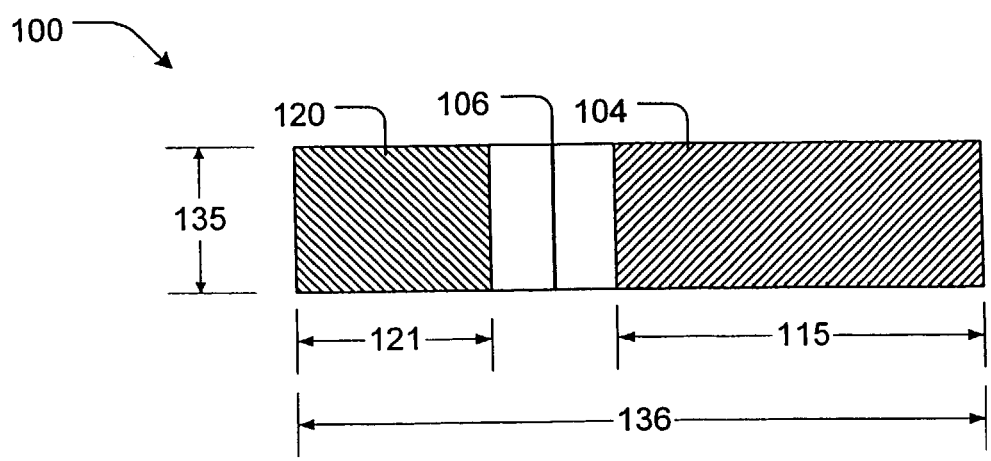
FIG. 3 illustrates a top view of the image pickup module of FIG. 2.

FIG. 2 illustrates a cutaway side view of a compact image pickup module 100 according to one embodiment of the present invention. FIG. 3 illustrates a top view of the image pickup module 100 of FIG. 2. Referring to FIGS. 2 and 3, the image pickup module 100 can include a light source 102 adapted to provide light (incident light 103) incident on an imaging surface 104. An object such as a finger 101 is placed on the imaging surface 104 for imaging. The incident light 103 meets the imaging surface at an incident angle with respect to a normal angle such that total internal reflection (TIR) is experienced by the incident light 103 at the imaging surface 104. The TIR phenomenon and the incident angle requirements to achieve the TIR are known in the art. Width 115 of the imaging surface 104 can vary depending on the sizes of the objects to be imaged and size of the various components of the image pickup module 100 such as mirrors 110 and 120 and image sensor 108, and can range from fractions of millimeters (mm) to tens of centimeters (cm). For an implementation as a part of a fingerprint scanning system as illustrated in the Figures, the width 115 of the imaging surface 115 can range from several millimeters to several centimeters.

As the incident light 103 reflects off of the imaging surface 104, different portions of the incident light 103 experience different amount of scattering, absorption, and reflection. This is because of fingerprint ridges and valleys present at the imaging surface 104. Accordingly, the reflection results in reflected light 105 having portions of varying intensities, the varying intensities representing the fingerprint pattern.

The first mirror 110 directs the reflected light 105 toward the second mirror 120 by reflecting the reflected light 105. The directed light 107 passes through an aperture 112 toward the second mirror 120. The aperture 112 is defined by a light shield 106 fabricated within the image pickup module 100. The second mirror 120 again directs the directed light 107 toward an image sensor 108 by reflecting the directed light 107. For convenience, light 109 from the second mirror 120 to the image sensor 108 is referred to as the twice-directed light 109. The first mirror 110 and the second mirror 120 operates on the reflected light 105 to focus the reflected light 105 onto the image sensor 108.

Figure 1:
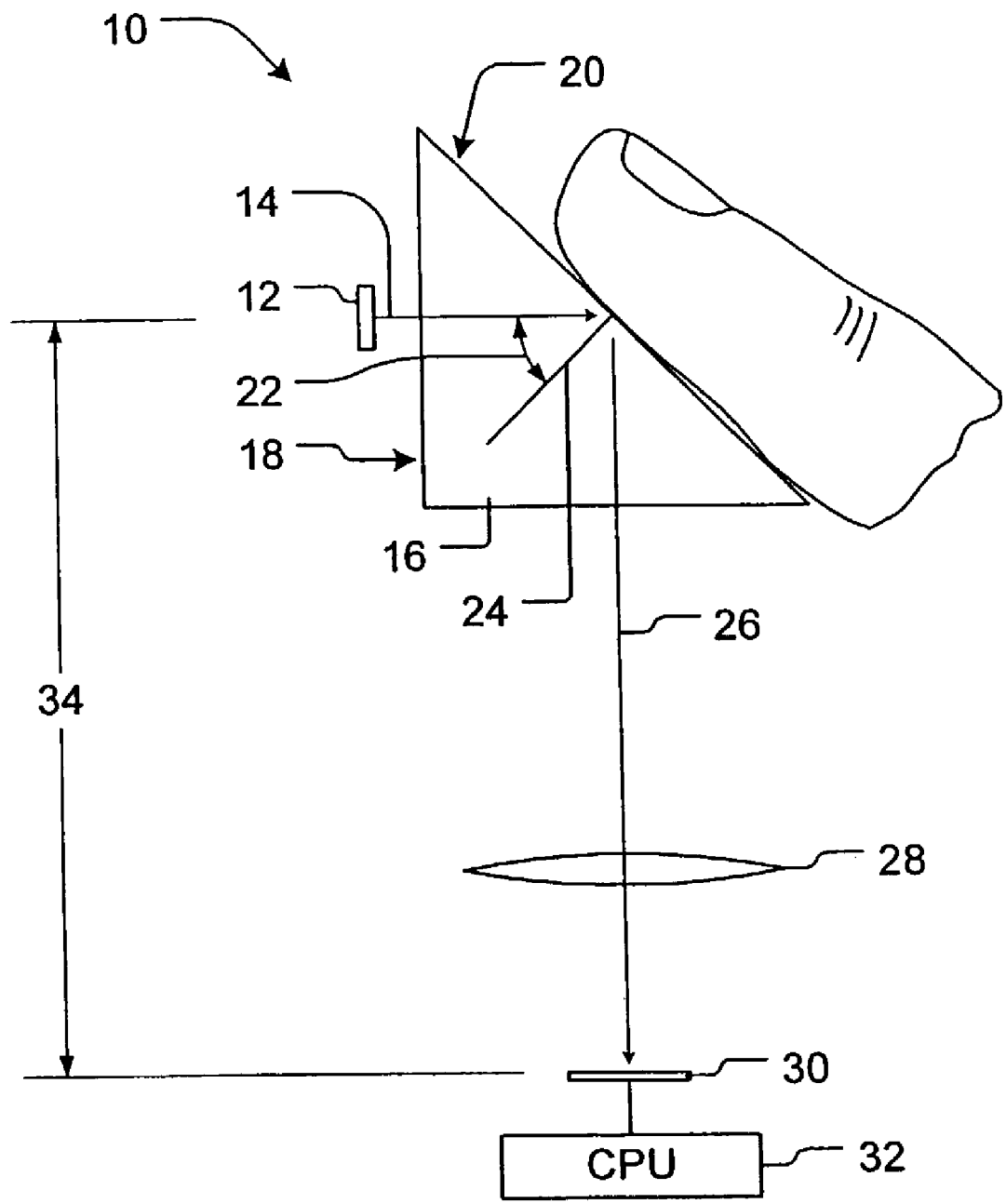
FIG. 1 illustrates a prior art image pickup system.

The use of the mirrors 110 and 120 to direct the reflected light 105 (embodying the fingerprint information) has the effect of folding the relatively long focal length 34 of FIG. 1 thereby allowing the compact image pickup module 100 to be manufactured having a reduced height 134. The size of the image pickup module 100 varies highly depending on the sizes of the objects to be imaged and size of the various components of the image pickup module 100 such as the mirrors 110 and 120 and the image sensor 108 and can range from fractions of millimeters (mm) to tens of centimeters (cm).

For an implementation as a part of a fingerprint scanning system as illustrated in the Figures, the height 134 of the image pickup module 100 can range from several millimeters (for example, five mm) to several centimeters (for example, two cm) and can be, for instance, approximately eight mm. Likewise, the depth 135 of the image pickup module 100 can be highly variable within similar ranges. With a deeper image pickup module 100, entire fingerprint can be sensed by the imaging sensor 108. Illustrated in FIG. 3 is a relative shallow image pickup module 100 having a depth 135 of approximately 2.5 mm (between two mm and three mm). To capture an entire fingerprint, the finger 101 can be swiped across the imaging surface 104 during which multiple images can be sensed by the image sensor 108. The multiple images can be stitched together to form a complete fingerprint. The width 136 of the image pickup module 100, in the illustrated embodiment can range from several mm to several cm and can, for example, be approximately 12 mm. The image pickup module 100 can be fabricated using glass or any type of clear medium such as clear polymer compound, for example, clear plastic block.

The light source 102 can be external to the image pickup module 100 or fabricated with and within the image pickup module 100. The light source can be, for example, a light emitting diode (LED) emitting mostly green or red light.

The first mirror 110 can be manufactured using silver, aluminum, or other reflective material. Depending upon the geometric relationship of the first mirror 110 to the imaging surface 104, the aperture 112, and the second mirror 120, the first mirror 110 can be flat or concave. The degree of concavity depends, again, the geometric relationship; however, is expected to be slight. The size, or width 111, of the first mirror 110 is implementation dependent and can range from fractions of mm to several cm or more. In the illustrated implementation for fingerprint scanning system, the width 111 can range from approximately 0.5 mm to approximately 1.5 mm.

The second mirror 120 can be manufactured using silver, aluminum, or other reflective material. Depending upon the geometric relationship of the second mirror 120 to the first mirror 110, the aperture 112, and the image sensor, the second mirror 120 can be flat or convex. The degree of convexity depends, again, the geometric relationship; however, is expected to be slight. The size, or width 121, of the second mirror 110 is implementation dependent and can range from fractions of mm to several cm or more. In the illustrated implementation for fingerprint scanning system, the width 111 can range from approximately 1.5 mm to approximately 3.5 mm.

The light shield 106 can be used to shield the incident light 103 from the second mirror 120. The light shield 106 defines the aperture 112 through which the directed light 107 passes through to reach the second mirror 120.

The image sensor 108 is typically external to the image pickup module 100 but can be fabricated with the image pickup module 100. The image sensor 108 can be, for example, a CMOS (complementary metal-oxide semiconductor) sensor array or a CCD (charge-coupled device) sensor array.

Figure 4:
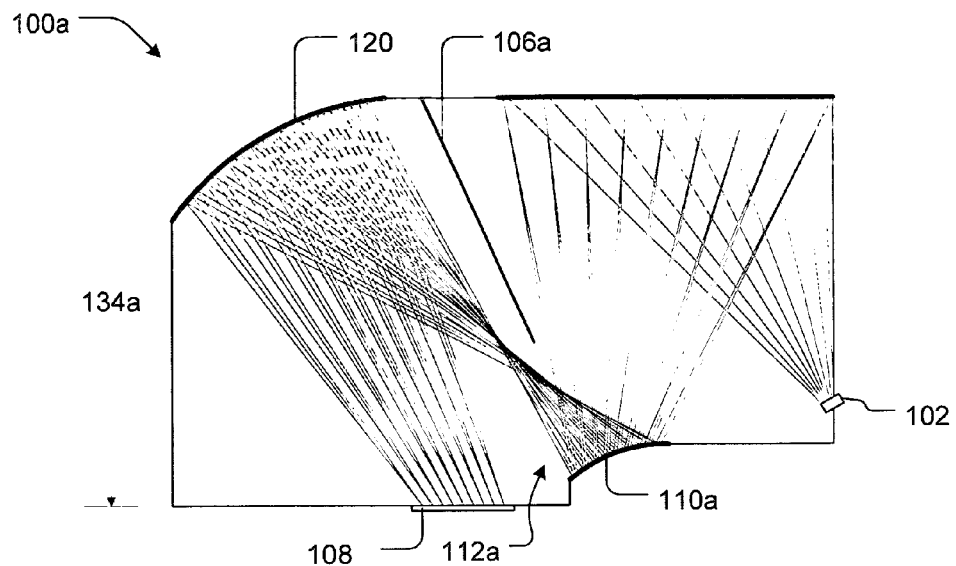
FIG. 4 illustrates a cutaway side view of an image pickup module according to another embodiment of the present invention.

Another embodiment of the present invention having certain alternative configuration is illustrated in FIG. 4. Portions of the image pickup module 100a shown in FIG. 4 are similar to the image pickup module 100 shown in FIGS. 2 and 3. For convenience, portions in FIG. 4 that are similar to portions in FIGS. 2 and 3 are assigned the same reference numerals, analogous but changed components are assigned the same reference numerals accompanied by letter "a", and different portions are assigned different reference numerals. Referring to FIG. 4, the image pickup module 100a includes a concave first mirror 110a directing the reflected light 105 toward a convex second mirror 120. Here, the geometrical relationships allow the aperture 112a to be defined by a gap 112a between the first mirror 110 and the light shield 106a.

Figure 5:
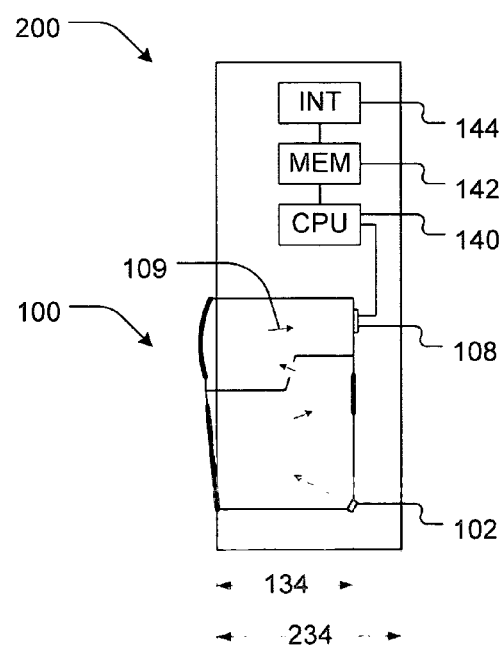
FIG. 5 illustrates a simplified block diagram of an electronic apparatus according to yet another embodiment of the present invention.

FIG. 5 illustrates a simplified block diagram of an electronic apparatus 200 such as a mobile wireless telephone 200 in accordance with yet another embodiment of the present invention. The electronic apparatus 200 can be other types of devices such as a computer mouse or a biometric security scanner. Portions of the electronic apparatus 200 shown in FIG. 5 are similar to those shown in FIGS. 2 and 3. For convenience, portions in FIG. 5 that are similar to portions in FIGS. 2 and 3 are assigned the same reference numerals, analogous but changed components are assigned the same reference numerals accompanied by letter "b", and different portions are assigned different reference numerals.

Referring to FIG. 5, the electronic apparatus 200 includes a light source 102 and the image pickup module 100 of FIGS. 2 and 3. The image sensor 108 is adapted to convert the twice directed light 109 into electronic signals. A microcontroller 140 connected to the image sensor 108 processes the electronic signals (representing a fingerprint image in the present example). A storage device 142 such as computer memory including random access memory, flash memory, magnetic, optical, or magneto-optical memory 142, connected to the microcontroller 140, can be adapted to store the electronic signals. The electronic apparatus 200 further includes an interface circuit 144 that can be used to communicate with a computer system (not shown) or a computer system on a network (not shown). For example, if the electronic apparatus 200 is a security scanner, the interface circuit 144 can be a USB (universal serial bus) circuit that allows the microcontroller 140 to communicate with a computer system to transfer the fingerprint image to the computer system.

Here, because the height 134 of the image pickup module 100 is relatively shorter than the prior art pickup module (as discussed above) the size, or height 234, of the electronic apparatus 200 can be smaller than an electronic apparatus having the prior art pickup module.

From the foregoing, it will be apparent that the device of the present invention is novel and offers advantages over the current art. The invention provides for an image pickup module having significantly smaller form factor allowing design and manufacture of electronic devices having smaller, more convenient size. Although specific embodiments of the invention is described and illustrated above, the invention is not to be limited to the specific forms or arrangements of parts so described and illustrated. The invention is limited only by the claims.

What is claimed is:

1. An image pickup module comprising:
    an imaging surface on which an object is placed for imaging, the imaging surface reflecting incident light;
    a first mirror for directing the reflected light toward a second mirror;
    the second mirror for directing the directed light toward an image sensor; and
    a light shield shielding the second mirror from the incident light.

2. The image pickup module recited in claim 1 wherein said image pickup module comprises clear polymer.

3. The image pickup module recited in claim 1 wherein said image pickup module has a height ranging from five mm to 20 mm.

4. The image pickup module recited in claim 1 wherein said image pickup module has a depth ranging from two mm to three mm.

5. The image pickup module recited in claim 1 further comprising a light source adapted to provide the incident light.

6. The image pickup module recited in claim 5 wherein said light source emits mostly green light.

7. The image pickup module recited in claim 5 wherein said light source emits mostly red light.

8. The image pickup module recited in claim 1 wherein said first mirror is slightly concave.

9. The image pickup module recited in claim 1 wherein said first mirror has a width ranging from 0.5 mm to 1.5 mm.

10. The image pickup module recited in claim 1 wherein said second mirror is slightly convex.

11. The image pickup module recited in claim 1 wherein said second mirror has a width ranging from 1.5 mm to 3.5 mm.

12. The image pickup module recited in claim 1 wherein said first mirror and said second mirror focuses the reflected light onto said image sensor.

13. The image pickup module recited in claim 1 wherein said light shield defines an aperture allowing the directed light to pass through the aperture.

14. The image pickup module recited in claim 1 wherein said image sensor is a CMOS sensor array.

15. An electronic apparatus comprising:
    a light source adapted to provide light incident on an imaging surface;
    an image pickup module comprising:
        the imaging surface on which an object is placed for imaging, the imaging surface reflecting the incident light;
        a first mirror directing the reflected light toward a second mirror;
        the second mirror directing the directed light toward an image sensor;
        the image sensor adapted to convert the twice directed light into electronic signals;
        a light shield shielding the second mirror from the incident light; and a microcontroller connected to the image sensor, adapted to process the electronic signals.

16. The electronic apparatus recited in claim 15 further comprising storage connected to said microcontroller adapted to store the electronic signals.

17. The electronic apparatus recited in claim 15 further comprising an interface circuit, connected to the microcontroller, enabling the electronic apparatus to communicate with a computer system.

18. The electronic apparatus recited in claim 15 wherein the electronic apparatus is a computer pointing device.

19. The electronic apparatus recited in claim 15 wherein said light shield defining an aperture allowing the directed light to pass through the aperture.

* * * * *